(12) United States Patent
Cao et al.

(10) Patent No.: US 12,097,588 B2
(45) Date of Patent: Sep. 24, 2024

(54) CARRIER TRANSMISSION DEVICE, TRANSMISSION SYSTEM AND CARRIER TRANSMISSION METHOD

(71) Applicants: Tyco Electronics (Shanghai) Co., Ltd., Shanghai (CN); TE Connectivity Services GmbH, Schaffhausen (CH)

(72) Inventors: Jian Cao, Shanghai (CN); Lvhai (Samuel) Hu, Shanghai (CN); Dandan (Emily) Zhang, Shanghai (CN); Fengchun (Fred) Xie, Shanghai (CN); An (Joshua) Yang, Shanghai (CN); Yun (Shanghai) Liu, Shanghai (CN); Roberto Francisco-Yi Lu, Bellevue, WA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 18/165,501

(22) Filed: Feb. 7, 2023

(65) Prior Publication Data
US 2023/0249303 A1 Aug. 10, 2023

(30) Foreign Application Priority Data
Feb. 7, 2022 (CN) .......................... 202210116626.3

(51) Int. Cl.
*B23Q 5/38* (2006.01)
*F16H 55/28* (2006.01)

(52) U.S. Cl.
CPC ............. *B23Q 5/385* (2013.01); *F16H 55/28* (2013.01)

(58) Field of Classification Search
CPC ... B23Q 5/385; F16H 55/08; F16H 2019/046; B65G 35/06
See application file for complete search history.

(56) References Cited

U.S. PATENT DOCUMENTS

2018/0237034 A1* 8/2018 Kageyama .............. F16H 19/04

FOREIGN PATENT DOCUMENTS

| EP | 1120329 A1 * | 8/2001 | ............... B62D 3/12 |
| JP | 09291360 A * | 11/1997 | |
| JP | 2005206051 A * | 8/2005 | |
| WO | WO-2005123339 A2 * | 12/2005 | ............. B23Q 5/385 |

OTHER PUBLICATIONS

EP 1120329 A1 (Adrian Ballester) Aug. 1, 2001 (full text). [online] [retrieved on Nov. 29, 2023]. Retrieved from: ProQuest Dialog. (Year: 2001).*

(Continued)

*Primary Examiner* — Joseph Brown
(74) *Attorney, Agent, or Firm* — Barley Snyder (57) ABSTRACT

A carrier transmission device comprises a slide rail, a rack and a pair of gears. The slide rail extends along a transmission direction of a carrier to be transmitted and is adapted to slidingly guide the carrier. The rack extends along the transmission direction and is connectable to, or integrally formed on, the carrier. The pair of gears are spaced by a predetermined distance in the transmission direction and are adapted to engage with the rack and drive the carrier to move in the transmission direction on the slide rail.

18 Claims, 5 Drawing Sheets

(56) References Cited

OTHER PUBLICATIONS

JP 09291360 A (Taizo Fujiyama) Nov. 11, 1997 (full text). [online] [retrieved on Nov. 29, 2023]. Retrieved from: ProQuest Dialog. (Year: 1997).*
JP 2005206051 A (Toyoji Terada) Jan. 23, 2004 (full text). [online] [retrieved on Nov. 29, 2023]. Retrieved from: Clarivate Analytics. (Year: 2004).*
English translation of WO 2005123339 A2 (Year: 2005).*

* cited by examiner

CARRIER TRANSMISSION DEVICE, TRANSMISSION SYSTEM AND CARRIER TRANSMISSION METHOD

CROSS-REFERENCE TO RELATED APPLICATIONS

This application claims the benefit of Chinese Patent Application No. CN202210116626.3 filed on Feb. 7, 2022, in the State Intellectual Property Office of China, the whole disclosure of which is incorporated herein by reference.

FIELD OF THE INVENTION

The present invention relates to a carrier transmission device, a transmission system comprising the carrier transmission device and a method of transmitting a carrier.

BACKGROUND

In the prior art, component carrier transmission systems are primarily driven by linear actuators or cylinders. In some simple automation solutions, the component carrier transmission is performed by a servo module, which cannot adapt to the transmission of multiple carriers, and which offers low transmission efficiency. In order to improve speed and efficiency, some applications use dual servo modules, together with specific tooling, to transport multiple carriers as a group in turn. However, in these implementations, due to the limitations of mechanical structures, cumulative tolerance or tooling design, the transmission speed and positioning accuracy of the system are insufficient. Other types of carrier transmission systems cannot meet the payload requirements of specific processes, such as welding and crimping.

SUMMARY

According to an embodiment of the present disclosure, a carrier transmission device comprises a slide rail, a rack and a pair of gears. The slide rail extends along a transmission direction of a carrier to be transmitted and is adapted to slidingly guide the carrier. The rack extends along the transmission direction and is connectable to, or integrally formed on, the carrier. The pair of gears are spaced by a predetermined distance in the transmission direction and are adapted to engage with the rack and drive the carrier to move in the transmission direction on the slide rail.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a carrier transmission device comprises of a slide rail, a rack and a pair of gears. The slide rail extends along a transmission direction of a carrier to be transmitted and is adapted to slidingly fit with the carrier to guide the carrier to move along the slide rail. The rack extends along the transmission direction and is connected to, or integrally formed on, the carrier. The pair of gears are spaced by a predetermined distance in the transmission direction, and are adapted to engage with the rack. When the gear engages with the rack on the carrier, the carrier is driven to move along the transmission direction on the slide rail.

Figure 1:
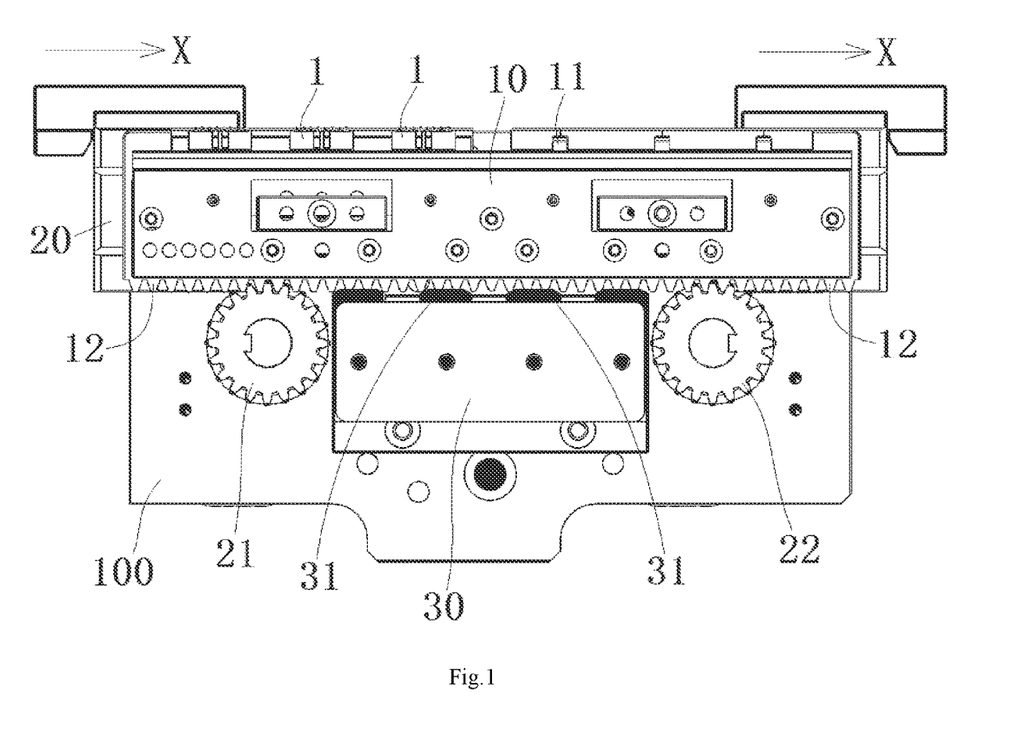
FIG. 1 shows a top view of a carrier transmission device according to an exemplary embodiment of the present invention.
Figure 2:
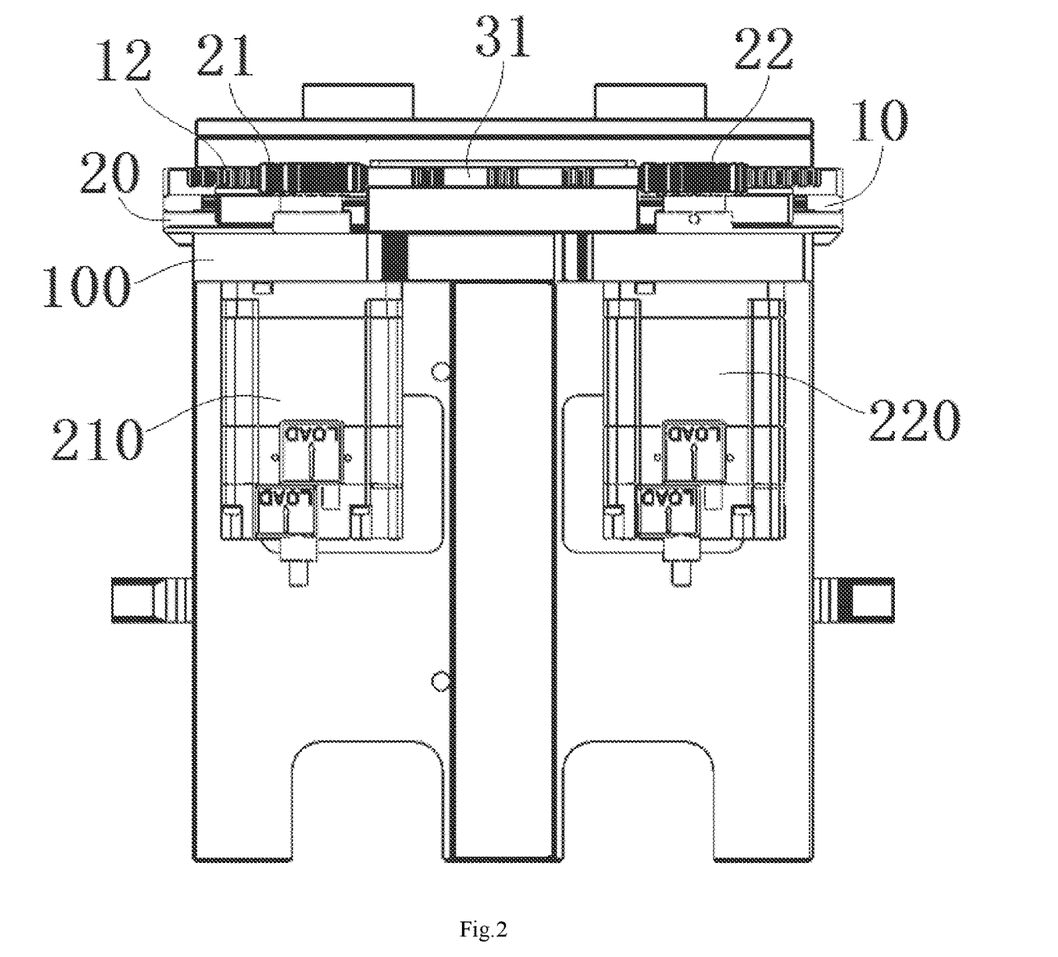
FIG. 2 shows a front view of a carrier transmission device according to an exemplary embodiment of the present invention.

FIG. 1 is a top view of a carrier transmission device according to an exemplary embodiment of the present invention. FIG. 2 is a front view of a carrier transmission device according to an exemplary embodiment of the present invention. In the illustrated embodiment, the carrier transmission device includes a slide rail 20, a rack 12 and a pair of gears 21,22. The carrier 10 is used to load product components 1, such as electronic components. The slide rail 20 extends in a transmission direction X of the carrier 10. The carrier 10 can slide on the slide rail 20. The rack 12 extends along the transmission direction X and is connected to, or integrally formed on, the carrier 10. The pair of gears 21,22 engage with the rack 12 and are spaced by a predetermined distance in the transmission direction X.

Figure 3A:
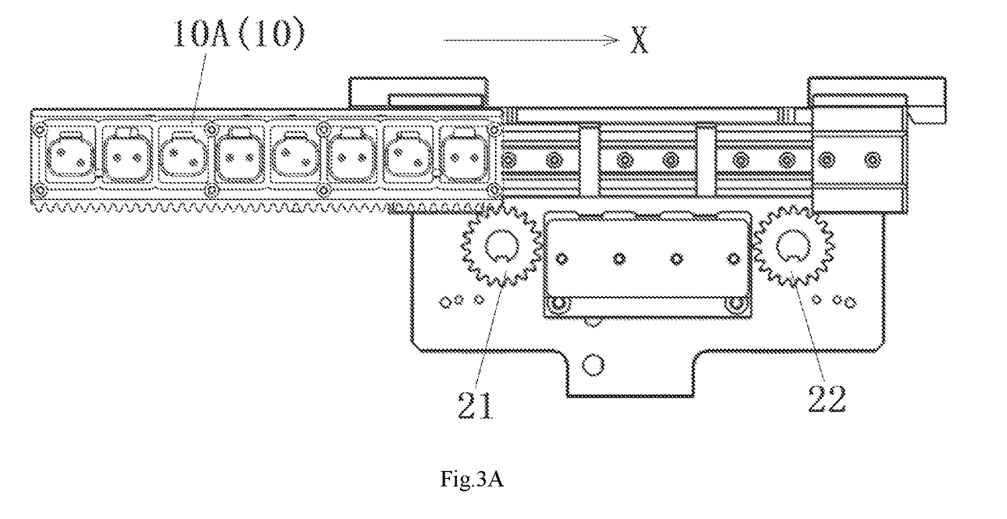
FIG. 3A shows a schematic diagram in which a rack on a first carrier is conveyed to engage with a first gear.
Figure 3B:
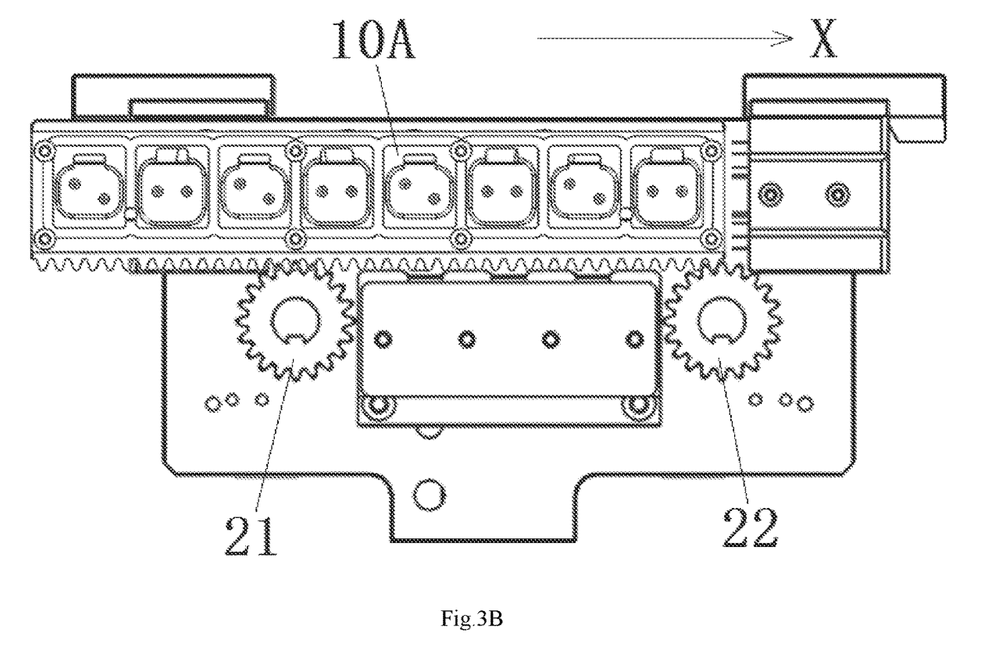
FIG. 3B shows a schematic diagram in which the rack on the first carrier is transmitted to engage with the first and a second gear.
Figure 3C:
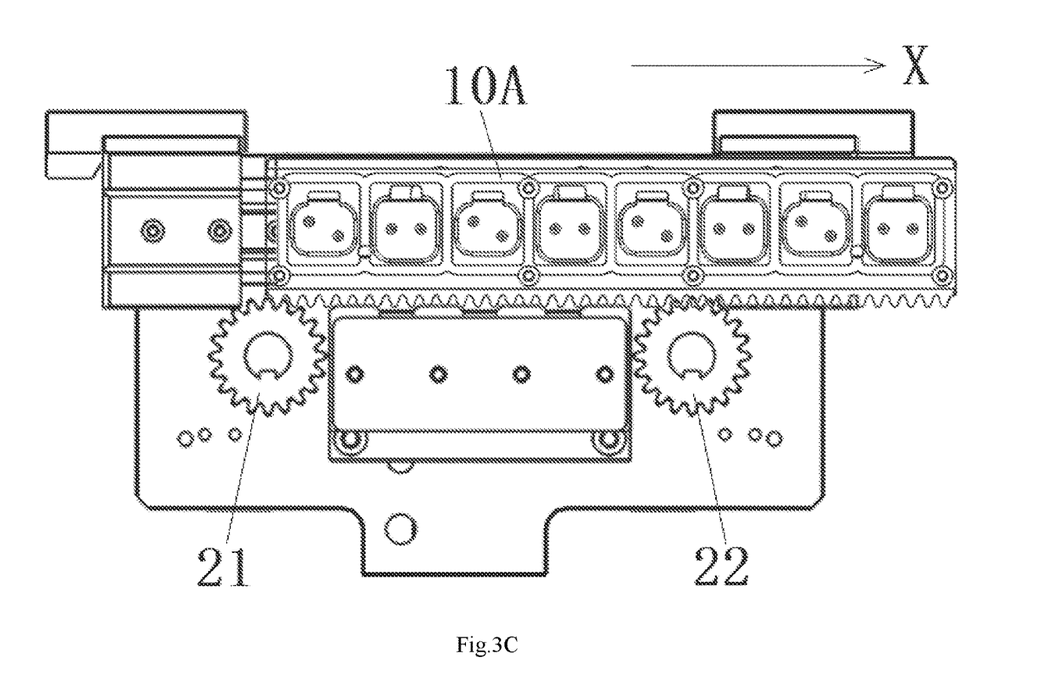
FIG. 3C shows a schematic diagram in which the rack on the first carrier is transmitted to separate from the first gear.
Figure 3D:
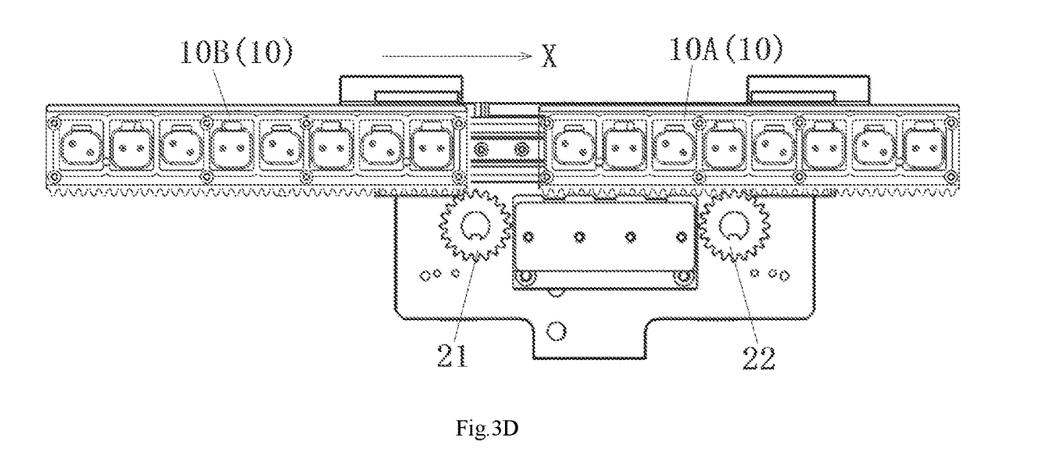
FIG. 3D shows a schematic diagram in which the rack on a second carrier is conveyed to engage with the first gear while the first carrier is being transmitted.
Figure 3E:
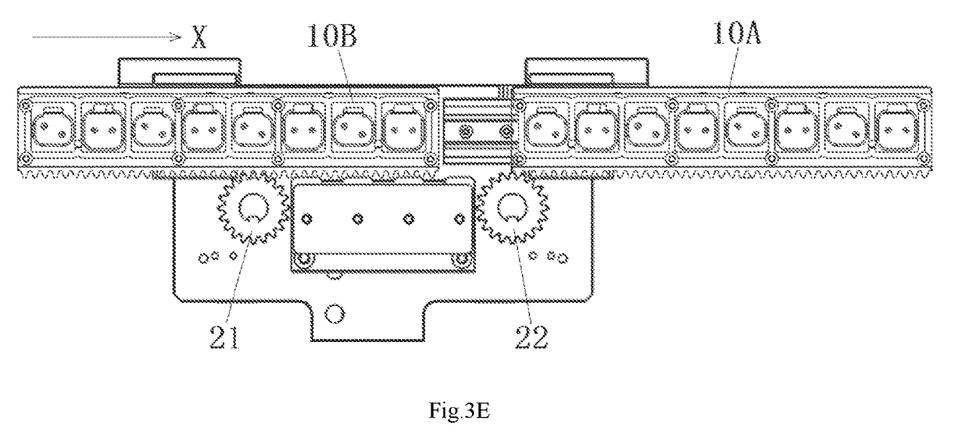
FIG. 3E shows a schematic diagram in which the rack on the first carrier is transmitted to separate from the second gear while the second carrier is being transmitted.
Figure 3F:
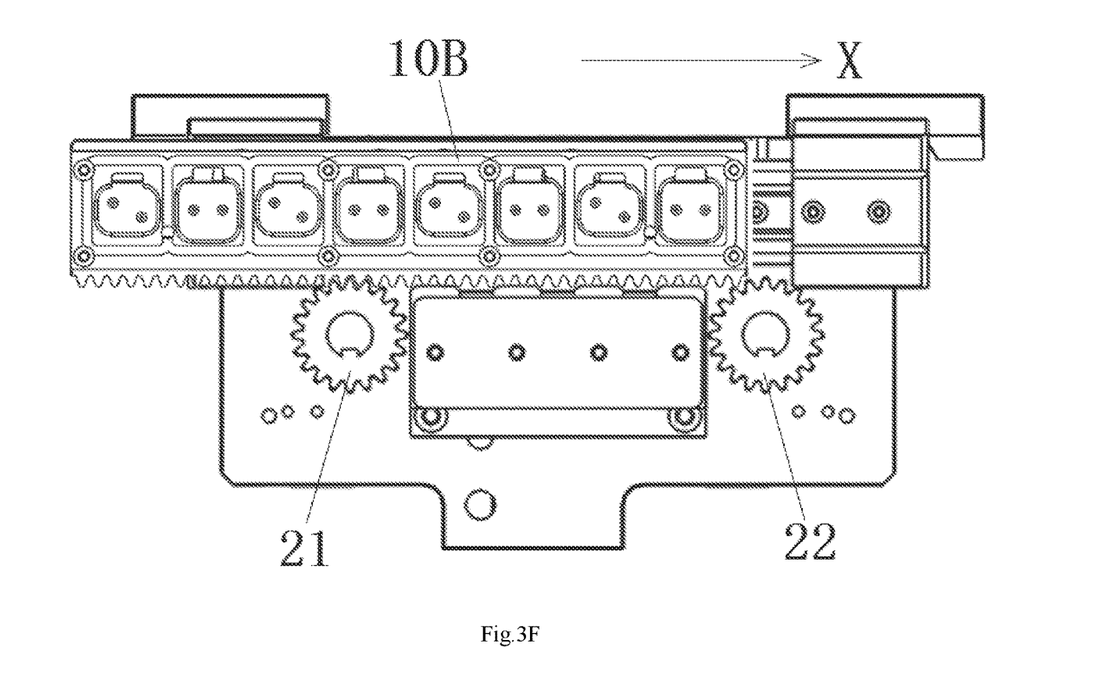
FIG. 3F shows a schematic diagram in which the rack on the second carrier is transmitted to engage with both gears after the first carrier is transmitted away from the second gear.

FIGS. 3A-3F show a working process of the carrier transmission device. Specifically, FIG. 3A shows the schematic diagram in which the rack 12 on one carrier 10A when it is conveyed to just engage with the gear 21. FIG. 3B shows a schematic diagram in which the rack 12 on the carrier 10A is transmitted to engage with the gears 21,22. FIG. 3C shows the schematic diagram in which the rack 12 on the carrier 10A is transmitted to separate from the gear 21. FIG. 3D shows the schematic diagram in which the rack 12 on another carrier 10B is transmitted to engage with the gear 21 while the carrier 10A is being transmitted. FIG. 3E shows a schematic diagram in which the rack 12 on the carrier 10A is transmitted to separate from the gear 22 while the carrier 10B is being transmitted. FIG. 3F shows a schematic diagram in which the rack 12 on the carrier 10B is transmitted to engage with the gears 21,22 after the carrier 10A is transmitted away from the gear 22.

As shown in FIGS. 1-3F, as the gears 21,22 rotatingly engage with the rack 12, the carrier 10 is driven to move along the transmission direction X on the slide rail 20. In the illustrated embodiment, the length of the rack 12 is greater than the spacing between the pair of gears 21,22 in the transmission direction X. In this way, the pair of gears 21,22 can engage with the same rack 12 at the same time.

The carrier transmission device also includes a blocking device 30. The blocking device 30 is used to generate friction contact with the rack 12 and apply a friction resistance opposite to the transmission direction X on the rack 12. As a result, a clearance between the teeth of the rack 12 and the teeth of the gear 21 is reduced to zero. By eliminating the clearance between the teeth of the rack 12 and the teeth of the gear 21 engaged with it, the positional accuracy of the carrier 10 during transmission is improved. The blocking device 30 includes an elastic member 31. The elastic element 31 is in friction contact with the rack 12 to apply friction resistance to the rack 12.

The carrier transmission device also includes a pair of driving devices 210,220, which are used to drive the pair of gears 21,22 to rotate respectively. The drive device 210,220 includes a servo motor and a transmission mechanism. The transmission mechanism is connected between the output shaft of the servo motor and the gear 21,22. In an exemplary embodiment of the present invention, the rotation speed of the servo motor and/or the transmission ratio of the transmission mechanism can be adjusted, such that the rotation speed of gears 21,22 can be adjusted by adjusting the rotation speed of the servo motor and/or the transmission ratio of the transmission mechanism.

According to embodiments, when the pair of gears 21,22 are engaged with the rack 12 on the same carrier 10 at the same time, the pair of driving devices 210,220 drive the pair of gears 21,22 to rotate synchronously to drive the carrier 10 to move. When the pair of gears 21,22 respectively engage with the racks 12 on two separate carriers 10, the pair of driving devices 210,220 drive the pair of gears 21,22 to rotate synchronously to drive the two carriers 10 to move synchronously. When one gear 21 of the pair of gears 21,22 engages with the rack 12, the drive device 210 of the gear 21 drives the gear to rotate. Similarly, when the gear 22 of the pair of gears 21,22 engages with the rack 12, the drive device 220 of the gear 22 drives it to rotate. Further, when the gear 21 of the pair of gears 21,22 is separated from the rack 12, the driving device 210 of the gear 21 drives the gear to reset to its initial position to wait for the next carrier 10. Similarly, when the gear 22 of the pair of gears 21,22 is separated from the rack 12, the driving device 210 of the gear 22 drives the gear to reset to its initial position to wait for the next carrier 10.

The carrier transmission device also includes a support frame 100. The slide rail 20 and the blocking device 30 are fixed on the support frame 100. The pair of gears 21,22 are rotationally mounted on the support frame 100, and the pair of driving devices 210,220 are mounted on the support frame 100.

A transmission system is also disclosed, which includes the carrier transmission device and the carrier 10. The carrier 10 is used for loading the product components 1 and is suitable for sliding fit with the slide rail 20 of the carrier transmission device to be able to move along the slide rail 20. A fixture 11 suitable for fixing the product component 1, such as a product component fixing fixture, is provided or integrally formed on the carrier 10.

The steps of the carrier transmission method of the present invention will be described below with reference to FIGS. 3A-3F. The carrier transmission method primarily includes the steps of:

S10: providing the carrier transmission device according to the above-described embodiments;

S20: conveying a carrier 10A to a predetermined position on the slide rail 20, so that the rack 12 on the carrier engages with the gear 21;

S30: driving the gear 21 to rotate, so as to drive the carrier 10A to move along the transmission direction X on the slide rail 20;

S40: when the rack 12 on the carrier 10A is moved to engage with the gear 22, the gear 22 is driven to rotate synchronously with the gear 21;

S50: when the rack 12 on the carrier 10A is moved to separate from the gear 21, the gear 21 is driven to, and stopped at, its initial position;

S60: conveying another carrier 10B to the predetermined position on the slide rail 20 so that the rack 12 on the carrier 10B engages with the gear 21;

S70: driving the gear 21 to rotate, so as to drive the carrier 10B to move along the transmission direction X on the slide rail 20;

S80: when the rack 12 on the carrier 10A is moved to separate from the gear 22, the other gear 22 is driven to, and stopped at, its initial position;

S90: when the rack 12 on the carrier 10B is moved to engage with the gear 22, the gear 22 is driven to rotate synchronously with the gear 21; and S100: repeating the above steps S20 to S90.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A carrier transmission device, comprising:
   a slide rail extending along a transmission direction of a first carrier to be transmitted and adapted to slidingly guide the first carrier;
   a first rack extending along the transmission direction and connectable to, or integrally formed on, the first carrier;
   a pair of gears spaced by a predetermined distance in the transmission direction and adapted to engage with the first rack and drive the first carrier to move in the transmission direction on the slide rail;
   a support frame on which the slide rail and a blocking device are fixed, wherein the pair of gears are rotationally mounted on the support frame: and
   the blocking device adapted to contact with the first rack and apply a friction resistance on the first rack opposite to the transmission direction, the blocking device is arranged on the support frame and between the pair of gears in the transmission direction, the blocking device engaging with teeth of the first rack.

2. The carrier transmission device according to claim 1, wherein the blocking device comprises an elastic element in frictional contact with the first rack to apply the friction resistance thereto.

3. The carrier transmission device according to claim 1, wherein a length of the first rack is greater than the spacing between the pair of gears in the transmission direction such that the pair of gears are capable of engaging with the first rack at the same time.

4. The carrier transmission device according to claim 1, further comprising a pair of driving devices driving the pair of gears to rotate, respectively.

5. The carrier transmission device according to claim 4, wherein each of the driving devices comprises:
   a servo motor; and
   a transmission mechanism connected between an output shaft of the servo motor and the gear.

6. The carrier transmission device according to claim 5, wherein a rotation speed of at least one of the servo motors or a transmission ratio of the transmission mechanisms are adjustable such that the rotation speed of the gear is adjustable.

7. The carrier transmission device according to claim 4, wherein when the pair of gears engage with the first rack at the same time, the pair of driving devices drive the pair of gears to rotate synchronously to drive the first carrier to slide along the slide rail.

8. The carrier transmission device according to claim 4, further comprising a second rack and a second carrier, wherein when the pair of gears respectively engage with the two racks, the pair of driving devices drive the pair of gears to rotate synchronously to drive the two carriers to move synchronously.

9. The carrier transmission device according to claim 4, wherein when a first gear of the pair of gears engages with the first rack, the driving device corresponding to the first gear drives the first gear to rotate.

10. The carrier transmission device according to claim 4, wherein when a first gear of the pair of gears is separated from the first rack, the driving device corresponding to the first gear drives the first gear to reset to an initial position.

11. The carrier transmission device according to claim 4, wherein the pair of driving devices are mounted on the support frame.

12. The carrier transmission device according to claim 11, wherein:
   the slide rail is arranged on a top of the support frame;
   the teeth of the first rack extend laterally from a side thereof;
   the pair of gears are arranged on the top of the support frame and rotate in a plane parallel to a plane on which the first carrier slides on the slide rail; and
   the blocking device is arranged on the top of the support frame.

13. A transmission system, comprising:
   a first carrier adapted to be loaded with product components and including a first toothed rack; and
   a carrier transmission device, including:
      a slide rail extending along a transmission direction of the first carrier and receiving and guiding the carrier to slide along the slide rail;
      a pair of toothed gears spaced by a predetermined distance in the transmission direction and engaging with the rack to drive the first carrier to slide in the transmission direction on the slide rail; and,
      an elastic blocking device contacting a toothing of the first rack and applying a friction resistance on the first rack opposite to the transmission direction.

14. The transmission system according to claim 13, wherein the carrier transmission device further comprises a pair of driving devices driving the pair of gears to rotate, respectively.

15. The transmission system according to claim 14, wherein each of the driving devices comprises a servo motor, and a transmission mechanism connected between an output shaft of the servo motor and the gear.

16. The transmission system according to claim 14, further comprising a second carrier including a second toothed rack, wherein:
   when the pair of gears engage with the first rack of the first carrier at the same time, the pair of driving devices drive the pair of gears to rotate synchronously to drive the carrier to move;
   when the pair of gears respectively engage with the first and second racks of the first and second carriers, the pair of driving devices drive the pair of gears to rotate synchronously to drive the first and second carriers to move synchronously;
   when a first gear of the pair of gears engages with the first rack, the driving device corresponding to the first gear drives the first gear to rotate; and
   when the first gear of the pair of gears is separated from the first rack, the driving device corresponding to the first gear drives the first gear to reset to an initial position.

17. The transmission system according to claim 13, wherein a length of the first rack is greater than the spacing between the pair of gears in the transmission direction such that the pair of gears are capable of engaging with the first rack at the same time.

18. A carrier transmission device, comprising:
   a slide rail extending along a transmission direction of a carrier to be transmitted;
   a carrier slidably supported on the slide rail;
   a rack defining teeth and extending along the transmission direction and connectable to, or integrally formed on, the carrier;
   a pair of gears spaced by a predetermined distance in the transmission direction and adapted to engage with the teeth of the rack and drive the carrier to slide in the transmission direction on the slide rail; and a blocking device arranged between the pair of gears in the transmission direction and fixed relative to the slide rail, the blocking device engaging with the teeth of the rack and applying a friction resistance on the rack opposite to the transmission direction.

* * * * *